Sept. 9, 1958                H. KÖHLER                    2,850,945
                  TWO-LENS TELESCOPE OBJECTIVE WITH
                      REDUCED SECONDARY SPECTRUM
                         Filed June 18, 1956
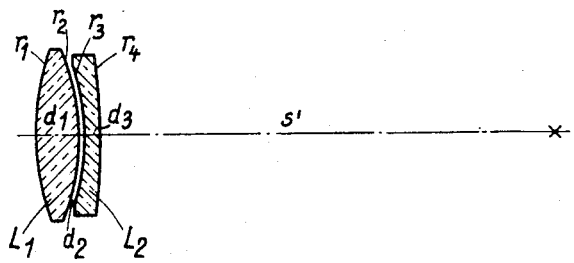

United States Patent Office 2,850,945
Patented Sept. 9, 1958

2,850,945

TWO-LENS TELESCOPE OBJECTIVE WITH REDUCED SECONDARY SPECTRUM

Horst Köhler, Heidenheim (Brenz), Wurttemberg, Germany, assignor to Carl Zeiss, Heidenheim (Brenz), Wurttemberg, Germany Application June 18, 1956, Serial No. 592,216

2 Claims. (Cl. 88—57)

The present invention concerns an improvement in two-lens telescope objectives with the aim to reduce the secondary spectrum in telescopes of this kind. The invention refers to objectives of the kind that is comprised of one collective lens and of one dispersive lens separated from it by an air-space.

The theory of telescope objectives which consist of two thin lenses, states that the secondary spectrum is given by the relation:

$$\Delta s' = - f \cdot \frac{\varphi_1 - \varphi_2}{\nu_1 - \nu_2} \qquad (1)$$

on the assumption that the primary chromatic aberration is corrected for the colours C and F. $\Delta s'$ is then in the relation stated above the longitudinal aberration for a third colour for which the relative partial dispersion referring to the first lens is $\varphi_1$, and to the second lens is $\varphi_2$. Furthermore $f$ designates the focal length and $\nu$ the Abbe number for the glasses of these lenses.

Generally one considers the secondary spectrum for the violet mercury line $g$; then $$\varphi = \frac{n_g - n_C}{n_F - n_C}$$

In order to reduce the secondary spectrum one must select a pair of glasses for which the expression $$\frac{\varphi_1 - \varphi_2}{\nu_1 - \nu_2}$$

is as small as possible. In the two-lens objectives so far known normally a pair of glasses was used whose collective lens consisted of an ordinary crown glass and whose dispersive lens consisted of a so-called telescope flint glass. Now telescope flints do guarantee suitable values of $\nu$ and of $\varphi$ so that the factor $$\frac{\varphi_1 - \varphi_2}{\nu_1 - \nu_2}$$

can be made smaller than in ordinary glass pairs. The refractive index of the so-called telescope flints lies, however, at a maximum of about 1.57. The low refractive index requires, however, deep curvatures and short radii. Consequently the application of such a combination is limited to objectives of aperture ratios of 1:10 and less. All the glasses so far known, also the so-called heavy flints with indices higher than 1.57 when in combination with a crown glass do not produce such low values of $$\frac{\varphi_1 - \varphi_2}{\nu_1 - \nu_2}$$

Even with heavy flint glasses in the rear dispersive lens the $\nu$-difference in the denominator of the equation is relatively high which is concurrently decisive for diminuting the numerical value of said equation. With heavy flints for the dispersive lens in combination with crown glass for the collective lens however, the difference of the relative partial dispersion in the numerator of the equation will be relatively high too. This frustrates the success aimed at with regard to considerably reducing the secondary spectrum of two-lens telescope objectives. The present invention takes advantage of a not generally known property of lanthanum flints according to which with their high refractive indices their numerical values of the Abbe number $\nu$ and of the relative partial dispersion $\varphi$ are similarly placed to those of the so-called telescope flints. The invention consists in combining a lanthanum flint glass of this type with such a crown glass that a sufficiently large difference of the $\nu$-values i.e. for $\nu_1 - \nu_2$ occurs, so that in order to comply with the conditions for achromatism the refractive surfaces can be given lower values of curvature, and that moreover these glasses have a smaller difference of their relative partial dispersions $(\varphi_1 - \varphi_2)$. Finally it is a special advantage for the invention to forgo cementing of the two lenses and to introduce an air-space between the two lenses. Following these recognitions the object of the present invention is a two-lens telescope objective with reduced secondary spectrum combined of a collective lens and of a dispersive lens separated from it by an air-space wherein according to the invention the dispersive lens consists of a glass of the group of lanthanum flints whose Abbe number is greater than 35 but smaller than 52 and whose relative partial dispersion $$\varphi = \frac{n_g - n_C}{n_F - n_C}$$

is greater than 1.56 and whose refractive index for the yellow helium line is greater than 1.7, and the collective lens consists of a glass whose Abbe number $\nu$ is greater than 65, and that furthermore the air-space amounts to a maximum of 5% of the focal length.

In the attached illustration an objective according to the invention has been represented for which numerical values are listed in the table given in the following. In the figure and in the table there are designated By L, the lenses.
By r, the radii of the surfaces.
By d, the separations of the surfaces from each other.
By $n_d$, the refractive indices.
By $\nu$, the Abbe numbers.

The data given in the table refer to a focal length of $f = 1.000$.

|  | Lens I | Lens II |
|---|---|---|
| $n_C =$ | 1.4853 | 1.7398 |
| $n_d =$ | 1.4875 | 1.7448 |
| $n_F =$ | 1.4923 | 1.7564 |
| $n_g =$ | 1.4960 | 1.7658 |
| $\nu_d =$ | 70.0 | 44.7 |
| $\varphi =$ | 1.527 | 1.563 |

$d_1 = 0.0878 \quad d_2 = 0.00928 \quad d_3 = 0.0299 \quad s' = 0.91484$
$r_1 = +0.49155 \quad r_2 = -0.43806 \quad r_3 = -0.43177 \quad r_4 = -1.23460$ Herein the values for $n$ designate the refractive indices for light of the corresponding spectrum lines and $\varphi$ the partial dispersion.

I claim:

1. A two-lens objective lens system of the telephoto type for prismatic telescopes and consisting of a single front collective biconvex lens element and a single rear dispersive meniscus shaped lens element having its concave side turned towards the said front collective lens element, the focal length of said front collective lens element and the focal length of said rear dispersive lens element being so related that the two said lens elements are axially separated apart by an air space amounting at least to .5% and at most to 5% of the focal length of the objective, the said front collective lens element consisting of a glass whose Abbe number is greater than 65, the said rear dispersive lens element consisting of a glass whose refractive index for the yellow helium line $n_d$ is greater than 1.70 and whose Abbe number is greater than 35 but smaller than 52 and whose relative partial dispersion $$\varphi = \frac{n_s - n_C}{n_F - n_C}$$

is greater than 1.56, in said front collective lens element the radius of the front surface having a value between $.35 \cdot f$ and $.60 \cdot f$ and the radius of its rear surface having an absolute value between $.35 \cdot f$ and $.55 \cdot f$, in said rear dispersive lens element the radius of the surface directed towards said front collective lens element having an absolute value between $.35 \cdot f$ and $.55 \cdot f$, $f$ being the focal length of the whole objective.

2. A two-lens objective lens system according to claim 1 with the constructive data of radii, apical separations and glasses corresponding to the values to be taken from the following table to an extent that the power of refraction ($\Delta n/r$) of each surface lies within a range of $\pm .5 \cdot 1/f$ and each apical separation lies within a range of $\pm .2 \cdot f$ on both sides of the said values:

| Lenses | Radii | Thicknesses and Separations | $n_d$ | $\nu_d$ | $\Delta n/r$ |
|---|---|---|---|---|---|
| $L_I$ | $r_1 = +0.49155 \cdot f$ | $d_1 = 0.0878 \cdot f$ | 1.4875 | 70.0 | $+0.991761/f$ |
|  | $r_2 = -0.43806 \cdot f$ | $d_2 = 0.00928 \cdot f$ |  |  | $+1.112861/f$ |
| $L_{II}$ | $r_3 = -0.43177 \cdot f$ | $d_3 = 0.0299 \cdot f$ | 1.7448 | 44.7 | $-1.724992/f$ |
|  | $r_4 = -1.23460 \cdot f$ |  |  |  | $+0.603272/f$ |

L being the lenses;
r being the radii;
d being the apical separations;
$n_d$ being the refractive indices;
$\nu_d$ being the Abbe numbers;
$\Delta n/r$ being the power of refraction of the surfaces, and
$f$ being the focal length of the objective lens system.

References Cited in the file of this patent

UNITED STATES PATENTS

| | | |
|---|---|---|
| 576,896 | Rudolph | Feb. 9, 1897 |
| 2,453,218 | Grey | Nov. 9, 1948 |
| 2,764,064 | Kohler | Sept. 25, 1956 |

FOREIGN PATENTS

| | | |
|---|---|---|
| 104,343 | Germany | July 28, 1899 |
| 189,255 | Germany | Sept. 30, 1907 |
| 847,600 | France | July 3, 1939 |
| 116,659 | Australia | Mar. 2, 1943 |